(12) United States Patent
Chou et al.

(10) Patent No.: US 7,069,369 B2
(45) Date of Patent: Jun. 27, 2006

(54) EXTENDED-SECURE-DIGITAL INTERFACE USING A SECOND PROTOCOL FOR FASTER TRANSFERS

(75) Inventors: Horng-Yee Chou, Palo Alto, CA (US);
Szu-Kuang Chou, Cupertino, CA (US);
Charles C. Lee, Sunnyvale, CA (US)

(73) Assignee: Super Talent Electronics, Inc., San Jose, CA (US)

( * ) Notice: Subject to any disclaimer, the term of this patent is extended or adjusted under 35 U.S.C. 154(b) by 294 days.

(21) Appl. No.: 10/708,634

(22) Filed: Mar. 16, 2004

(65) Prior Publication Data

US 2005/0182881 A1    Aug. 18, 2005

Related U.S. Application Data

(63) Continuation-in-part of application No. 10/708,172, filed on Feb. 12, 2004.

(51) Int. Cl.
*G06F 13/00* (2006.01)

(52) U.S. Cl. ............... 710/301; 710/302; 710/303; 710/304

(58) Field of Classification Search ......... 710/300–304
See application file for complete search history.

(56) References Cited

U.S. PATENT DOCUMENTS

| | | | |
|---|---|---|---|
| 5,652,839 A * | 7/1997 | Giorgio et al. ............. | 709/224 |
| 6,353,866 B1 | 3/2002 | Fensore et al. ............. | 710/104 |
| 6,356,582 B1 | 3/2002 | Mazer et al. ............... | 375/219 |
| 6,370,603 B1 | 4/2002 | Silverman et al. ............ | 710/72 |
| 6,415,342 B1 | 7/2002 | Wahl et al. ................. | 710/100 |
| 6,438,638 B1 * | 8/2002 | Jones et al. ................ | 710/301 |
| 6,501,163 B1 | 12/2002 | Utsumi ...................... | 257/679 |
| 6,634,561 B1 | 10/2003 | Wallace ..................... | 235/492 |
| 6,651,212 B1 | 11/2003 | Katayama et al. .......... | 714/763 |
| 6,666,724 B1 | 12/2003 | Lwee ........................ | 439/630 |

OTHER PUBLICATIONS

SD Group, SD-Memory Card Specifications, Part 1, Physical Layer Spec. Ver 1.01, Mar. 2001, pp. 1-32.
Mahon, "MultiMediaCard Specification, version 4.0 is Released" Press Release, Feb. 2004, pp. 1-3.

* cited by examiner

Primary Examiner—Tim Vo
(74) Attorney, Agent, or Firm—Stuart T. Auvinen (57) ABSTRACT

An extended Secure-Digital (SD) card has a second interface that uses some of the SD-interface lines. The SD card's mechanical and electrical card-interface is used, but 2 or 4 signals in the SD interface are multiplexed for use by the second interface. The second interface can have a single differential pair of serial-data lines to perform Universal-Serial-Bus (USB) transfers, or two pairs of differential data lines for Serial-Advanced-Technology-Attachment (SATA), Peripheral Component Interconnect Express (PCIE), or IEEE 1394 transfers. A card-detection routine on a host can initially use the SD interface to detect extended capabilities and command the card to switch to using the second interface. The extended SD card can communicate with legacy SD hosts using just the SD interface, and extended SD hosts can read legacy SD cards using just the SD interface, or extended SD cards using the second interface. MultiMediaCard and Memory Stick are alternatives.

21 Claims, 12 Drawing Sheets

FIG. 1

PRIOR ART

| PIN | DIRECTION | MMC | SPI | SD | USB | PCIE | SATA | 1394 |
|---|---|---|---|---|---|---|---|---|
| 1 | I/O | | CS | DAT3 | RSV | Tn0 | A- | TPA* |
| 2 | I/O | CMD | DIN | CMD | CMD | CMD/Tp0 | CMD/A+ | CMD/TPA |
| 3 | | VSS1 | VSS1 | VSS1 | VSS1 | VSS1 | VSS1 | VSS1 |
| 4 | | VDD | VDD | VDD | VDD | VDD | VDD | VDD |
| 5 | I | CLK | CLK | CLK | CLK | CLK | CLK | CLK |
| 6 | | VSS2 | VSS2 | VSS2 | VSS2 | VSS2 | VSS2 | VSS2 |
| 7 | I/O | DAT0 | DOUT | DAT0 | DAT0 | DAT0 | DAT0 | DAT0 |
| 8 | I/O | | | DAT1 | D+ | Rp0 | B+ | TPB |
| 9 | I/O | | | DAT2 | D- | Rn0 | B- | TPB* |

FIG. 10

| PIN | DIRECTION | MMC | SPI | SD | USB |
|---|---|---|---|---|---|
| 1 | I/O | | CS | | D- |
| 2 | I/O | CMD | DIN | CMD | CMD/D+ |
| 3 | | VSS1 | VSS1 | VSS1 | VSS1 |
| 4 | | VDD | VDD | VDD | VDD |
| 5 | I | CLK | CLK | CLK | CLK |
| 6 | | VSS2 | VSS2 | VSS2 | VSS2 |
| 7 | I/O | DAT0 | DOUT | DAT0 | DAT0 |

FIG. 11

| PIN | DIRECTION | MMC | SPI | SD | USB | PCIE | SATA | 1394 |
|---|---|---|---|---|---|---|---|---|
| 1 | I/O | DAT3 | CS | DAT3 | RSV | Tn0 | A- | TPA* |
| 2 | I/O | CMD | DIN | CMD | CMD | CMD/Tp0 | CMD/A+ | CMD/TPA |
| 3 | | VSS1 | VSS1 | VSS1 | VSS1 | VSS1 | VSS1 | VSS1 |
| 4 | | VDD | VDD | VDD | VDD | VDD | VDD | VDD |
| 5 | I | CLK | CLK | CLK | CLK | CLK | CLK | CLK |
| 6 | | VSS2 | VSS2 | VSS2 | VSS2 | VSS2 | VSS2 | VSS2 |
| 7 | I/O | DAT0 | DOUT | DAT0 | DAT0 | DAT0 | DAT0 | DAT0 |
| 8 | I/O | DAT1 | | DAT1 | D+ | Rp0 | B+ | TPB |
| 9 | I/O | DAT2 | | DAT2 | D- | Rn0 | B- | TPB* |
| 10 | I/O | DAT4 | | DAT4 | RSV | RSV | RSV | RSV |
| 11 | I/O | DAT5 | | DAT5 | RSV | RSV | RSV | RSV |
| 12 | I/O | DAT6 | | DAT6 | RSV | RSV | RSV | RSV |
| 13 | I/O | DAT7 | | DAT7 | RSV | RSV | RSV | RSV |

FIG. 12

| PIN | DIRECTION | MEMORY STICK | MS PRO DUO | USB | PCIE | SATA | 1394 |
|---|---|---|---|---|---|---|---|
| 1 |  | VSS | VSS | VSS | VSS | VSS | VSS |
| 2 | I | BS | BS | BS | BS | BS | BS |
| 3 | I/O | VCC | DAT1 | DAT1/D- | DAT1/T- | DAT1/T- | DAT1/TPA* |
| 4 | I/O | DAT0 | DAT0 | DAT0/D+ | DAT0/T+ | DAT0/T+ | DAT0/TPA |
| 5 | I/O | RSV | DAT2 | DAT2 | DAT2/R- | DAT2/R- | DAT2/TPB* |
| 6 | O | INS | INS | INS | INS | INS | INS |
| 7 | I/O | RSV | DAT3 | DAT3 | DAT3/R+ | DAT3/R+ | DAT3/TPB |
| 8 | I | SCLK | SCLK | SCLK | SCLK | SCLK | SCLK |
| 9 |  | VCC | VCC | VCC | VCC | VCC | VCC |
| 10 |  | VSS | VSS | VSS | VSS | VSS | VSS |

FIG. 13

EXTENDED-SECURE-DIGITAL INTERFACE USING A SECOND PROTOCOL FOR FASTER TRANSFERS

CROSS REFERENCE TO RELATED APPLICATIONS

This application is a continuation-in-part of the co-pending application for "Dual-Personality Extended-USB Plug and Receptacle with PCI-Express or Serial-AT-Attachment Extensions", U.S. Ser. No. 10/708,172, filed Feb. 12, 2004.

BACKGROUND OF INVENTION

This invention relates to removable-card interfaces, and more particularly to dual-protocol interfaces for removable cards.

Flash-memory cards are widely used for storing digital pictures captured by digital cameras. One useful format is the Secure-Digital (SD) format, which is an extension of the earlier MultiMediaCard (MMC) format. SD cards are thin and the area of a large postage stamp. Sony's Memory Stick (MS) is another digital-file-card format that is shaped somewhat like a stick of chewing gum.

SD cards are also useful as add-on memory cards for other devices, such as portable music players, personal digital assistants (PDAs), and even notebook computers. SD cards are hot-swappable, allowing the user to easily insert and remove SD cards without rebooting or cycling power. Since the SD cards are small, durable, and removable, data files can easily be transported among electronic devices by being copied to an SD card. SD cards are not limited to flash-memory cards, but other applications such as communications transceivers can be implemented as SD cards.

The SD interface currently supports a top transfer rate of 100 Mb/s, which is sufficient for many applications. However, some applications such as storage and transport of full-motion video could benefit from higher transfer rates.

Other bus interfaces offer higher transfer rates. Universal-Serial-Bus (USB) has a top transfer rate of 480 Mb/s. Peripheral-Component-Interconnect (PCI) Express, at 2.5 Gb/s, and Serial-Advanced-Technology-Attachment (SATA), at 1.5 Gb/s and 3.0 Gb/s, are two examples of high-speed serial bus interfaces for next generation devices. IEEE 1394 (Firewire) supports 3.2 Gb/s. Serial Attached Small-Computer System Interface (SCSI) supports 1.5 Gb/s or 3.0 Gb/s. These are 5 to 32 times faster than the SD interface.

A new removable-card form-factor known as Express-Card has been developed by the Personal-Computer Memory Card International Association (PCMCIA), PCI, and USB standards groups. ExpressCard 26 is about 75 mm long, 34 mm wide, and 5 mm thick and has ExpressCard connector 28. ExpressCard provides both USB and PCI Express interfaces on the same 26-pin card connector.

Serial-ATA is used mostly as an internal expansion interface on PC's, since it requires two separate connectors. A first 7-pin connector carries signals while a second 15-pin connector is for power. ExpressCard's large 26-pin connector limits its usefulness and increases the physical size of devices using ExpressCard connectors. Compact-Flash cards also tend to be larger in size than SD cards since Compact-Flash has more connector pins.

SD and MMC are complementary card interfaces, and are sometimes lumped together and referred to as SD/MMC cards. The older MMC cards have 7 metal connector pads while SD has 9 connector pads. MMC cards can fit in SD slots, and SD cards can fit in MMC slots. However, the host must determine which type of card is inserted into its slot. When a MMC card is inserted, only 7 pads are used, while the additional 2 pads are used when a SD card is detected in the slot.

Figure 1:
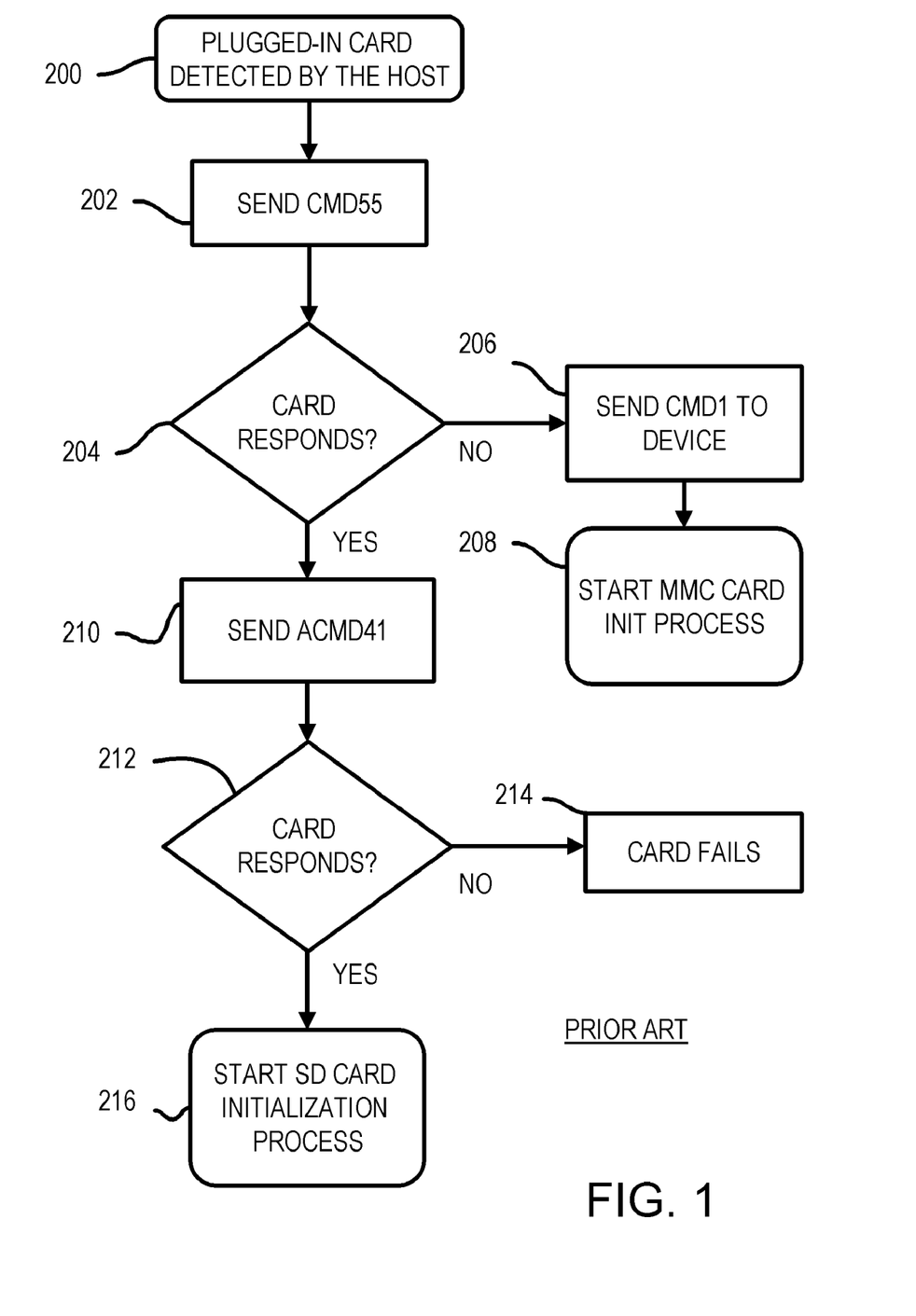
FIG. 1 shows a prior-art card-detection routine executed by a host.

FIG. 1 shows a prior-art card-detection routine executed by a host. The host, such as a host personal computer (PC) detects when a card is inserted into a slot, step 200, such as by detecting the card-detect (CD) pin that is pulled high by a resistor on the SD card. The host sends a sequence of commands to the inserted card that includes a CMD55 command, step 202. If the card does not respond properly to the CMD55 command, step 204, then the card is an MMC card, not a SD card. A sequence of commands is sent to the MMC card, step 206, which includes the CMD1 command. The MMC card is then initialized by a sequence of commands, such as the host reading configuration registers on the MMC card, step 208. The host uses the 7 pins shared with MMC to communicate with the MMC card.

When the inserted card responds to the CMD 55 command, step 204, then the card may be a SD card. Further commands are sent to the card including the advanced command ACMD41, step 210. If the card does not respond properly to the ACMD41, step 212, then the card fails, step 214.

When the card responds properly to the ACMD41, step 210, then the card is an SD card. The SD card is then initialized by a sequence of commands, such as the host reading configuration registers on the SD card, step 216. The host uses the 9-pin SD interface to communicate with the SD card. The host can use one data line or up to four data lines in the SD interface for communication. Data stored on the SD card can be encrypted using higher-level security protocols.

Figure 2:
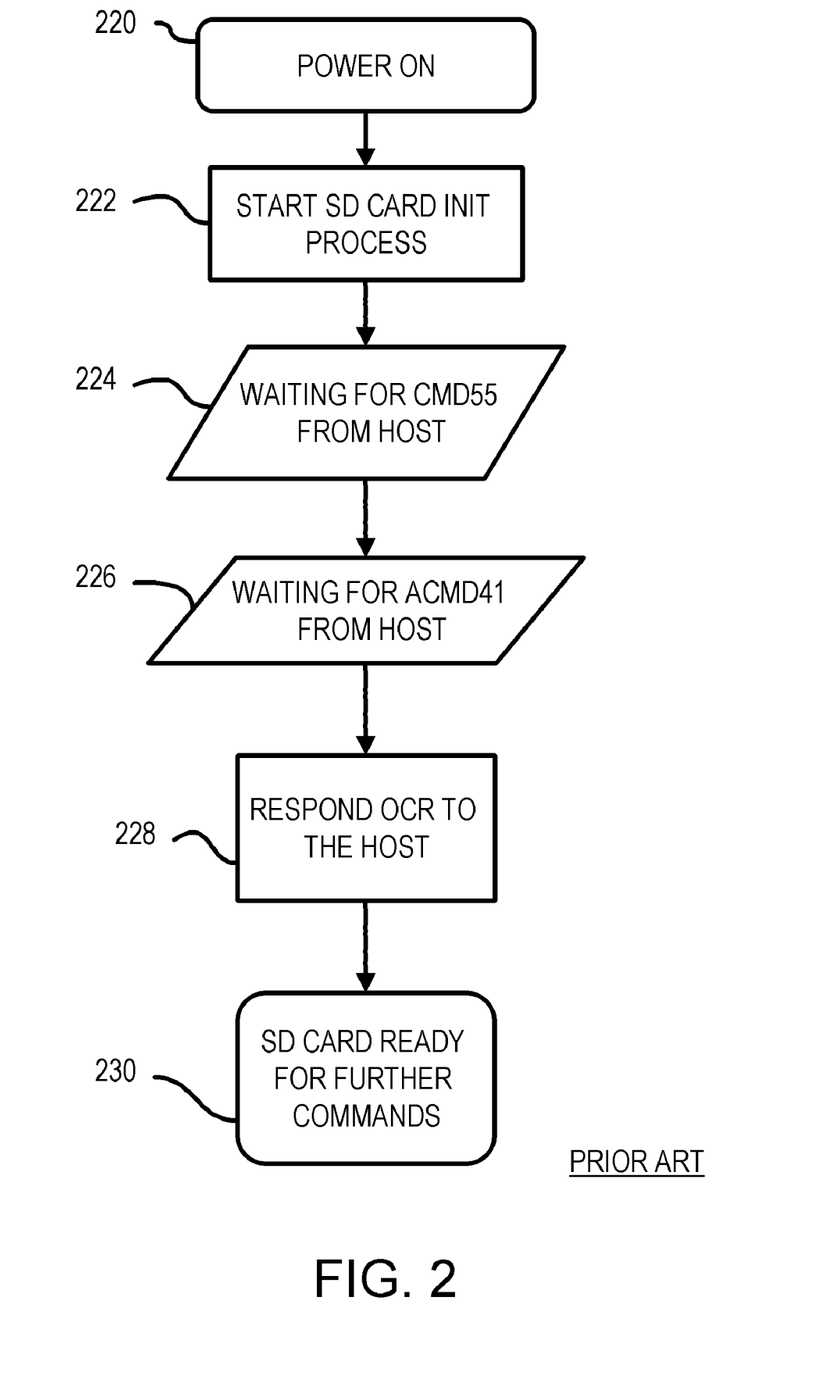
FIG. 2 is a flowchart of a prior-art detection-response routine executed by a SD card.

FIG. 2 is a flowchart of a prior-art detection-response routine executed by a SD card. The SD card obtains power from the metal contact pads when inserted into the host slot and powers up, step 220. A card-initialization routine is started, step 222, which may include various internal self-checks. A controller inside the SD card executes these routines, activates the external interface, and then waits for commands from the host. When a CMD55 is received from the host, step 224, then the SD controller waits for an ACMD41 from the host, step 226. The card responds to the ACMD41 from the host, step 228. The SD card is then ready to receive further commands from the host, step 230. The full 9-pin SD interface is used.

While either MMC or SD cards can be detected, the transfer rate using either MMC or SD cards is slower than many current bus standards. Applications such as video transfers could benefit from a higher-speed interface to a SD card. The thin, small size of the SD card is beneficial, but the slow transfer rates could limit SD-card use in the future. A higher-speed interface to the SD card is desired, as is a detection scheme for use when higher-speed interfaces are available.

DETAILED DESCRIPTION

The present invention relates to an improvement in insertable cards. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have discovered that the existing physical and electrical specifications for the SD card can be used while still supporting higher-speed transfers. The signals from the 9-pin SD-card interface can be multiplexed to controllers for other interfaces that support higher-speed transfers, such as USB, IEEE 1394, SATA, PCI-Express, etc. Thus data transfers can occur using higher-bandwidth protocols using the existing physical SD interface pins.

The invention can include a multi-personality host and card system. The application combinations include: a multi-personality host and a multi-personality device, a multi-personality host and a single-personality device, a single-personality host and a multi-personality device, and a single-personality host and a single-personality device.

An SD card modified to use a higher-speed serial bus is a very-high-speed SD card, or a VSD card, while a host that can communicate with a VSD card is a VSD host. A VSD card can act as a SD card when inserted into a legacy SD host, while a VSD host can read inserted SD cards. Thus the VSD card and host are backward-compatible.

Figure 3:
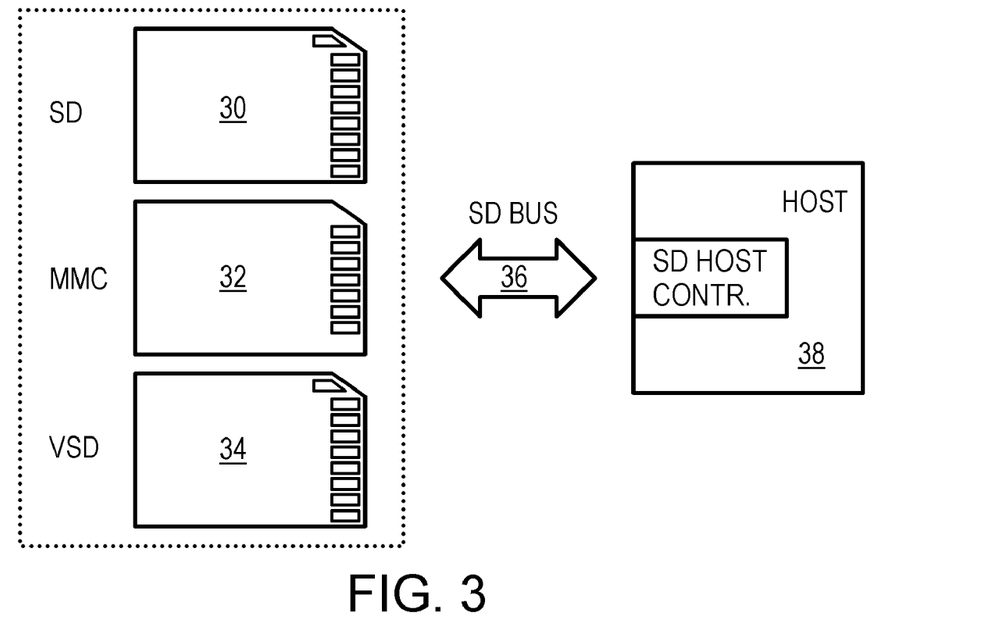
FIG. 3 shows a SD host accepting a MMC card, a SD card, or a Very-high-speed-Secure-Digital (VSD) card.

FIG. 3 shows a SD host accepting a MMC card, a SD card, or a VSD card. Host 38 is a legacy SD host that can detect and accept SD card 30 or MMC card 32. When VSD card 34 is inserted, the SD host controller on host 38 detects a SD card and configures VSD card 34 to operate as a SD card over the normal 9-pin SD interface and SD bus 36.

MMC card 32 has only 7 metal pads and uses 2 fewer of the lines on SD bus 36 than does SD card 30. SD card 30 has two extra metal pads that are not present on MMC card 32. One extra metal pad is added near the beveled corner of SD card 30, while another extra pad is added on the other side of the 7 metal pads. VSD card 34 has the same arrangement of the 9 metal pads as SD card 30, and can communicate over SD bus 36 with host 38 using the standard SD interface and protocol.

Figure 4:
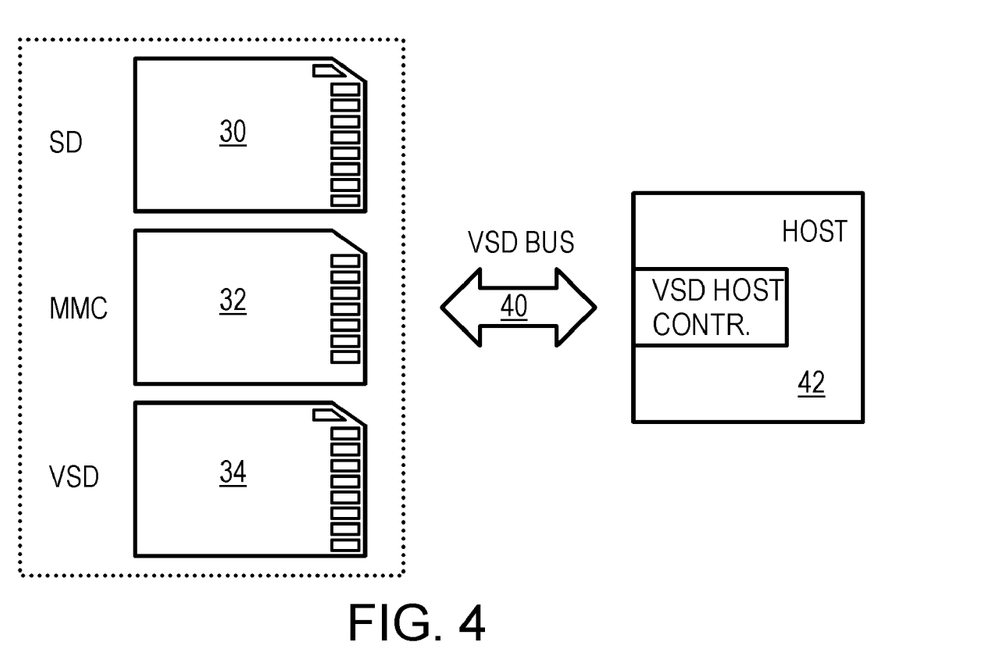
FIG. 4 shows an extended VSD host accepting a MMC card, a SD card, or a VSD card.

FIG. 4 shows an extended VSD host accepting a MMC card, a SD card, or a VSD card. Extended host 42 is a VSD host that can detect and accept SD card 30 or MMC card 32 or VSD card 34. When MMC card 32 is inserted, extended host 42 uses 7 pins of VSD bus 40 to communicate using the MMC pins and protocol. When SD card 30 is inserted, extended host 42 uses 9 pins of VSD bus 40 to communicate using the SD pins and protocol.

When VSD card 34 is inserted, the host controller on extended host 42 detects a VSD card and configures VSD card 34 to operate in extended mode using a high-speed serial-bus standard such as USB over VSD bus 40. Higher-bandwidth data transfers can then occur over VSD bus 40 using one of the serial-bus standards, such as USB, IEEE 1394, SATA, or PCI-Express.

VSD card 34 has the same arrangement of the 9 metal pads as SD card 30, but contains an internal controller that can couple an internal serial-bus controller to the metal pads rather than the normal SD controller. For example, a USB controller inside VSD card 34 can be coupled to some of the metal pads when VSD card 34 is operating in extended VSD mode.

Figure 5:
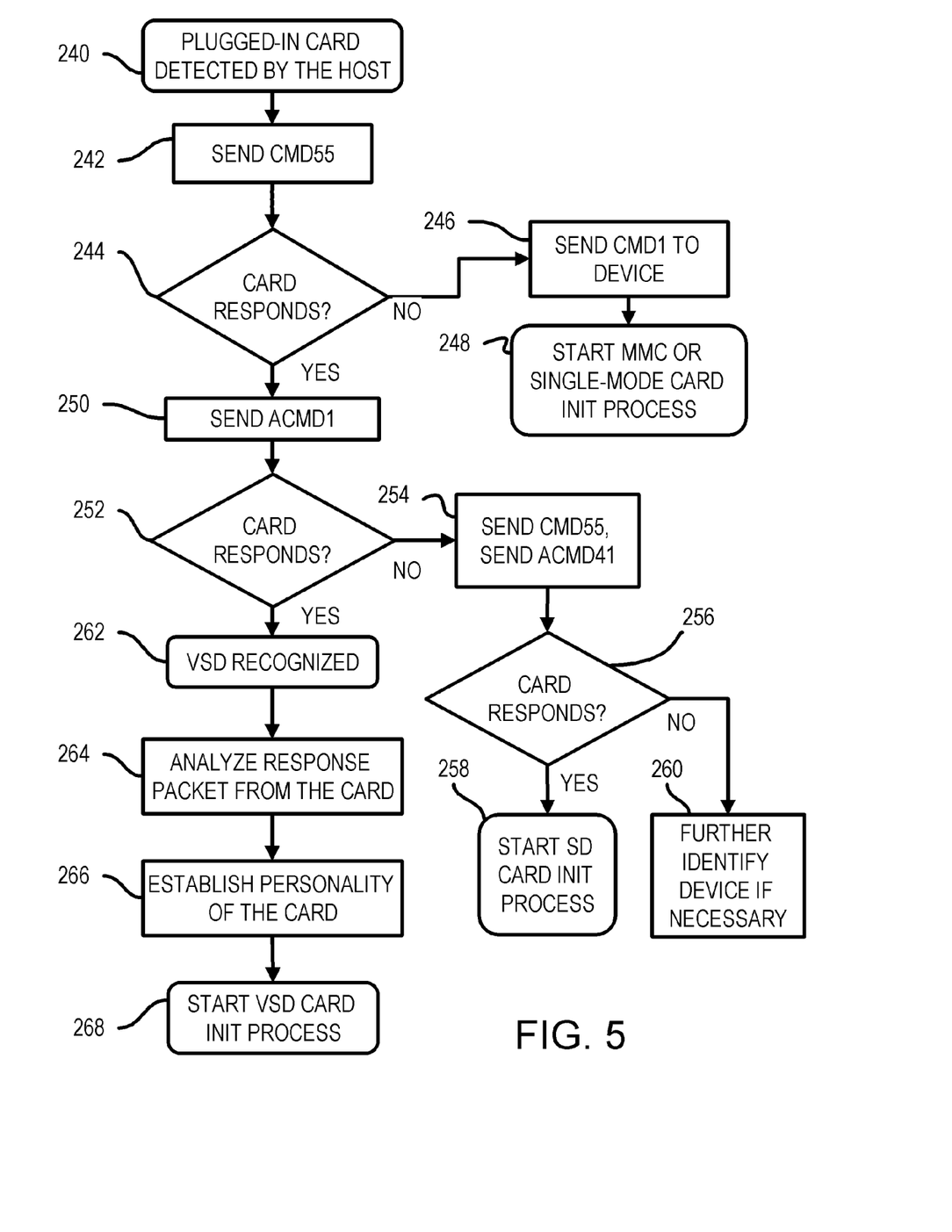
FIG. 5 is a flowchart of an extended VSD card-detection routine executed by a VSD host.

FIG. 5 is a flowchart of an extended VSD card-detection routine executed by a VSD host. The host, such as a host personal computer (PC) detects when a card is inserted into a slot, step 240, such as by detecting the card-detect (CD) pin that is pulled high by a resistor on the SD or VSD card. The VSD host sends a sequence of commands to the inserted card that includes a CMD55 command, step 242. If the card does not respond properly to the CMD55 command, step 244, then the card could be an MMC card, or a single-mode card, but not a SD or a VSD card. A sequence of commands is then sent to the card, step 246, including the CMD1 command. If card responds properly to the CMD1 command, then the card is an MMC card. The MMC card is then initialized by a sequence of commands, such as the host reading configuration registers on the MMC card, step 248. The host uses the 7 pins shared with MMC to communicate with the MMC card. If card dose not respond properly, the host may try to communicate with the card by switching to a different mode.

When the inserted card responds to the CMD 55 command, step 244, then the card may be a VSD card or a SD card. Further commands are sent to the card including the advanced VSD command ACMD1, step 250. If the card does not respond properly to the ACMD1, step 252, then the card cannot be a VSD card. The command sequence starts over again, re-sending the CMD55 command and later the ACMD41 command, step 254. ACMD1 is a specially-defined advanced command that only a VSD card responds to in the expected manner. For example, a VSD card could respond with a unique code used only for VSD.

When the card responds properly to the ACMD55 and ACMD41 commands, step 256, then the card is an SD card. The SD card is then initialized by a sequence of commands, such as the host reading configuration registers on the SD card, step 258. The host uses the 9-pin SD interface to communicate with the SD card. The host can use one data line or up to four data lines in the SD interface for communication. Data stored on the SD card can be encrypted using higher-level security protocols.

When the card does not respond properly to the ACMD55 and ACMD41 commands, step 256, then the card is another type of card. Further identification of the card type may be performed, step 260, or the card-detection routine can fail.

When the card responds properly to the ACMD1, step 252, then the card is a VSD card, step 262. The extended host can analyze responses from the card from this and other commands, step 264, to establish the personality and capabilities of the VSD card, step 266.

The VSD card is then initialized by a sequence of commands, such as the host reading configuration registers on the SD card, step 268. One of the extended serial-bus protocol processors is activated and connected to some of the 9 metal pads of the VSD bus to allow for extended-mode data transfers.

Figure 6:
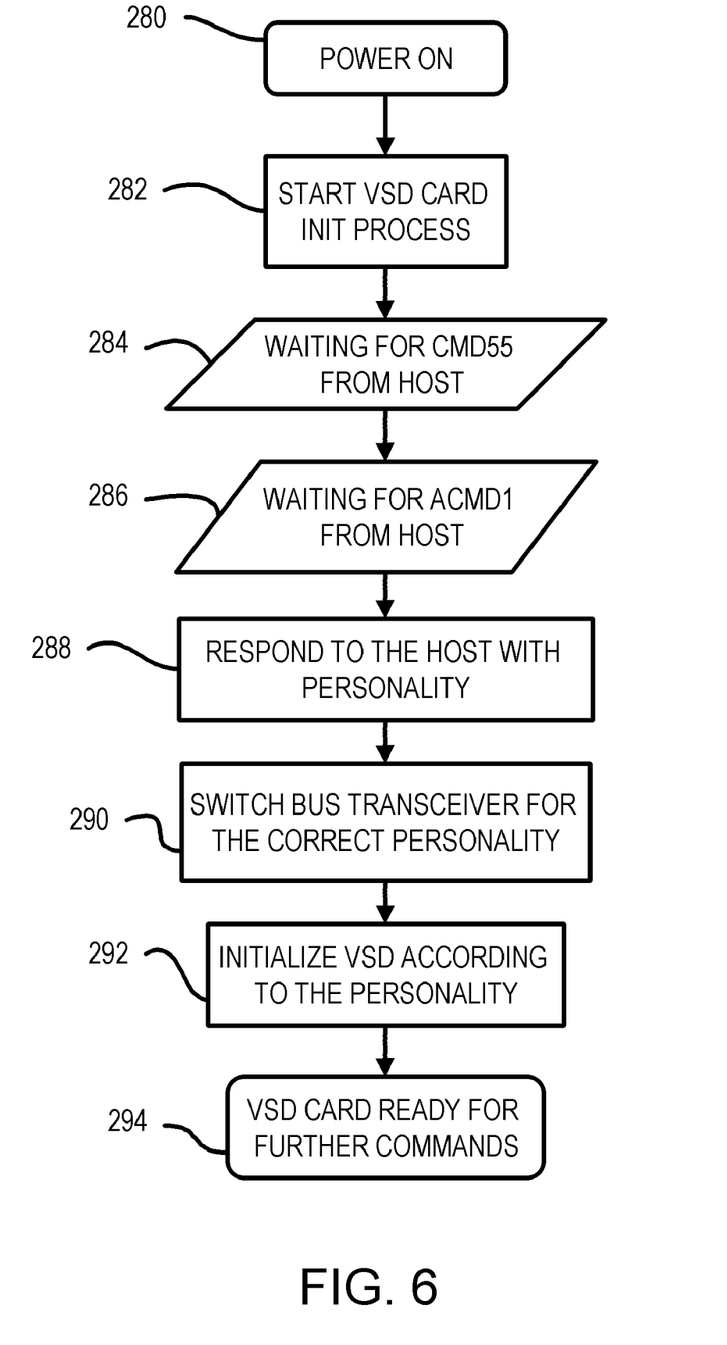
FIG. 6 is a flowchart of a VSD detection-response routine executed by a VSD card.

FIG. 6 is a flowchart of a VSD detection-response routine executed by a VSD card. The VSD card obtains power from the metal contact pads when inserted into the host slot and powers up, step 280. A card-initialization routine is started, step 282, which may include various internal self-checks. A controller inside the VSD card executes these routines, activates the external interface, and then waits for commands from the host. If it is a single-mode card, then the card waits for the host to switch to the same mode to communicate. If it is not a single-mode card, then it waits for the CMD55 command from host.

When a CMD55 is received from the host, step 284, then the VSD controller waits for the ACMD1 from the host, step 286. The VSD card responds to the ACMD1 from the VSD host by listing the available extended-serial-bus protocols that the card supports, step 288. The host chooses one of the available protocols that the host also supports. The card changes its bus transceivers to connect one of the extended serial-bus protocol processors to some of the 9 SD pins, step 290. For example, USB may be supported.

The host sends a command to the VSD card indicating which protocol to use, step 292. The VSD card then initializes the selected protocol processor and couples it to the appropriate pins on the VSD bus. The VSD card is then ready to receive further commands from the host, step 294.

Figure 7:
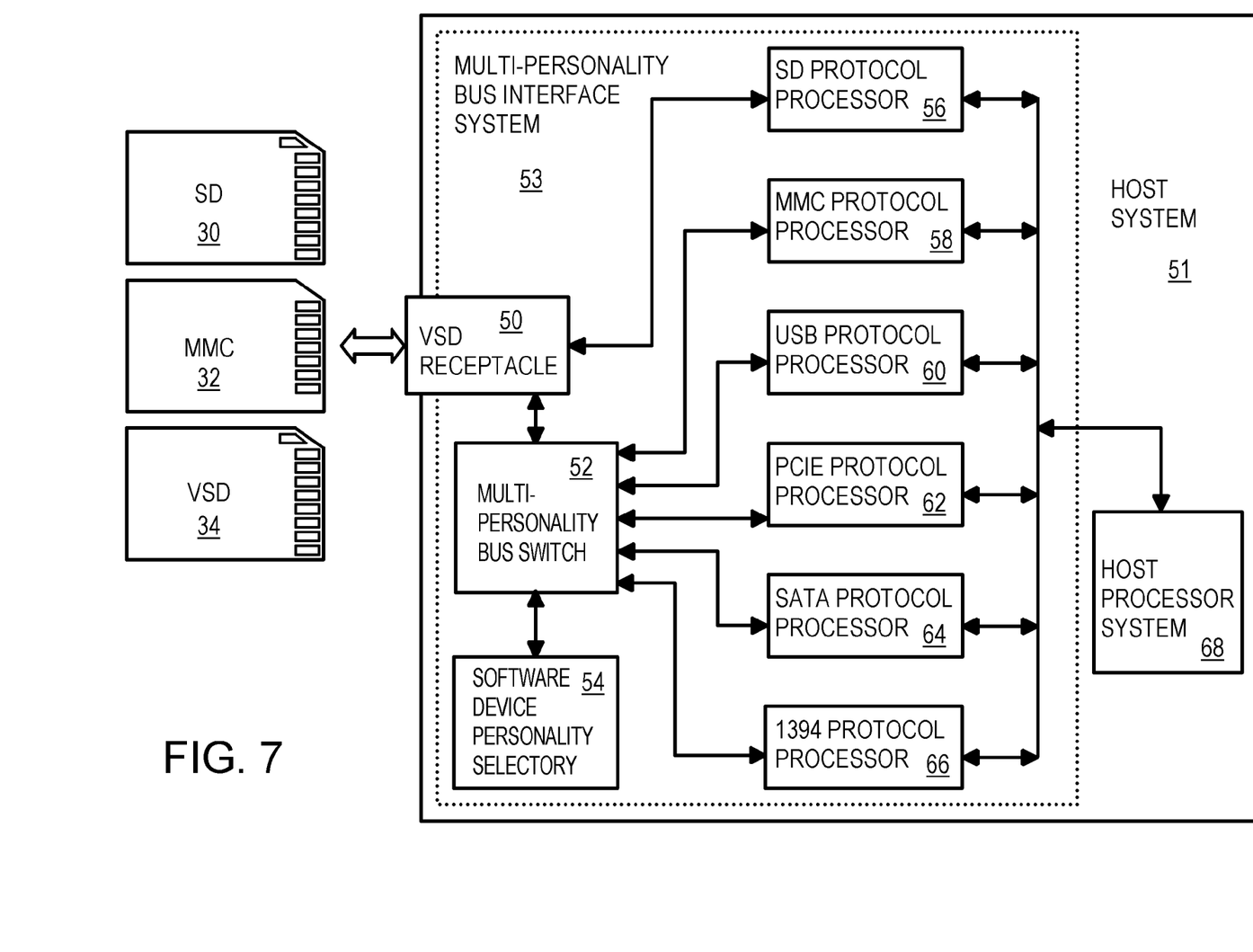
FIG. 7 is a block diagram of a host with an SD connector slot that supports extended-mode communication.
Figure 8:
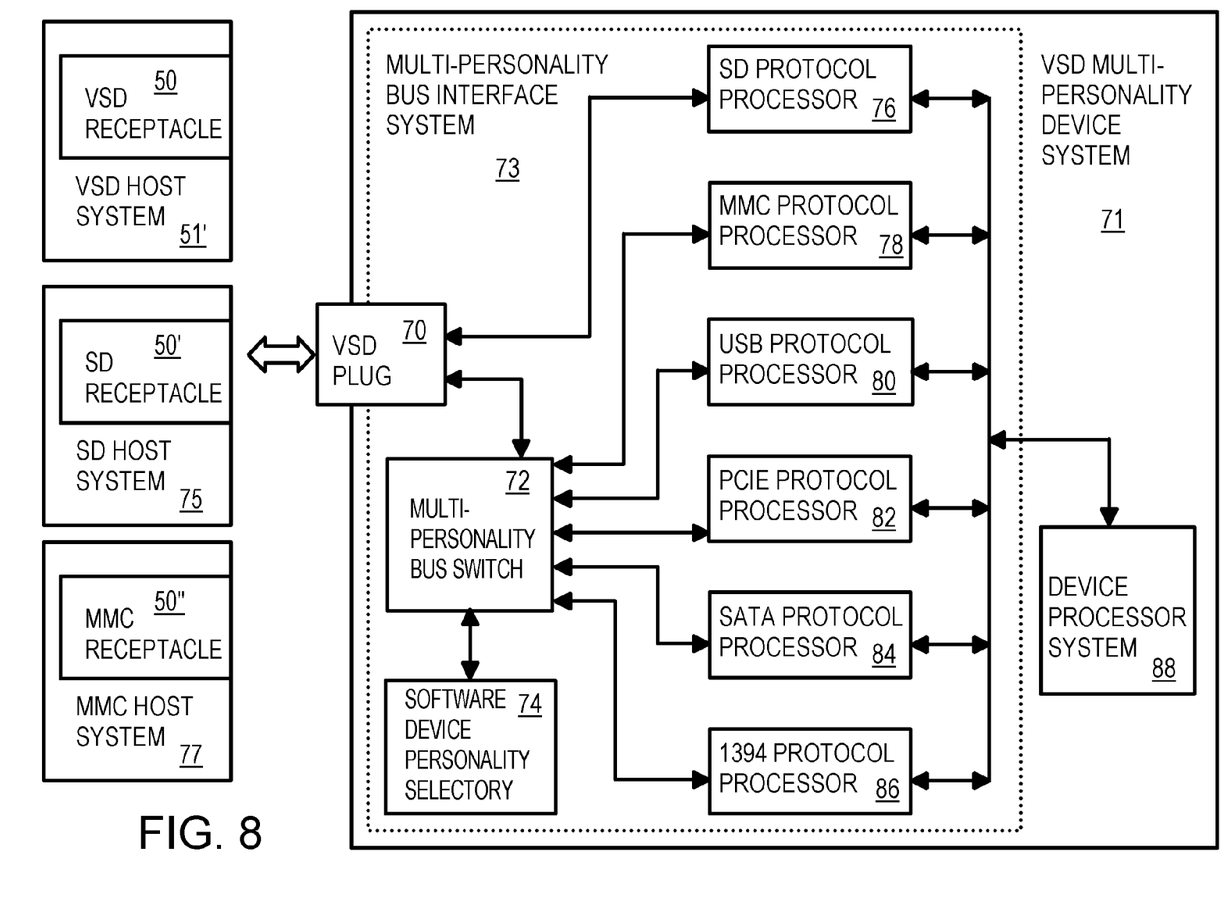
FIG. 8 is a block diagram of a VSD card device with an SD connector that supports VSD extended-mode communication.

System Block Diagrams—FIGS. 7–8

FIG. 7 is a block diagram of a host with an SD connector slot that supports extended-mode communication. SD card 30, MMC card 32, or VSD card 34 could be plugged into VSD connector slot 50 of host 51. Each card can operate in its own standard mode.

Host 51 has processor system 68 for executing programs including card-management and bus-scheduling programs. Multi-personality bus interface 53 processes data from processor system 68 using various protocols. SD processor 56 processes data using the SD protocol, and inputs and outputs data on the SD data lines in VSD connector slot 50. Other protocols communicate with VSD connector slot 50 through multi-personality bus switch 52, which selects one protocol processor.

The contact pins in VSD connector slot 50 connect to multi-personality bus switch 52 as well as to SD processor 56. Transceivers in multi-personality bus switch 52 buffer data to and from the transmit and receive pairs of differential data lines in the metal contacts for extended protocols such as PCI-Express, Firewire IEEE 1394, Serial-Attached SCSI, and SATA, and for the older MultiMediaCard.

When an initialization routine executed by processor system 68 determines that inserted card is a MMC card, MMC processor 58 is activated to communicate with MMC card 32 inserted into VSD connector slot 50, while SD processor 56 is disabled. Personality selector 54 configures multi-personality bus switch 52 to connect VSD connector slot 50 to MMC processor 58 when processor system 68 determines that the inserted card is MMC. When the inserted card is SD card 30, SD processor 56 continues to communicate with the card after initialization is complete.

When the initialization routine executed by processor system 68 determines that inserted card is VSD card 34, SD processor 56 continues to communicate with VSD card 34 until the capabilities of VSD card 34 are determined. Then one of the higher-speed serial-bus protocols is selected for use. For example, when processor system 68 determines that VSD card 34 supports PCI-Express, personality selector 54 configures multi-personality bus switch 52 to connect VSD connector slot 50 to PCI-Express processor 62. Then processor system 68 communicates with PCI-Express processor 62 instead of SD processor 56 when PCIE extended mode is activated.

When the initialization routine executed by processor system 68 determines that the inserted card is VSD card 34, and supports USB, personality selector 54 configures multi-personality bus switch 52 to connect VSD connector slot 50 to USB processor 60. Then processor system 68 communicates with USB processor 60 instead of SD processor 56 when USB extended mode is activated.

When the initialization routine executed by processor system 68 determines that the inserted card is VSD card 34 that supports SATA, personality selector 54 configures multi-personality bus switch 52 to connect VSD connector slot 50 to SATA processor 64. Then processor system 68 communicates with SATA processor 64 instead of SD processor 56 when SATA extended mode is activated.

When the initialization routine executed by processor system 68 determines that the inserted card is VSD card 34 that supports Firewire, personality selector 54 configures multi-personality bus switch 52 to connect VSD connector slot 50 to IEEE 1394 processor 66. Then processor system 68 communicates with IEEE 1394 processor 66 instead of SD processor 56 when IEEE 1394 extended mode is activated.

VSD card 34 may support more than one extended protocol. Then processor system 68 can select from among the supported protocols. For example, the faster protocol may be selected. VSD host 51 may not support all protocols shown in FIG. 7, but may only support a subset.

FIG. 8 is a block diagram of a VSD card device with an SD connector that supports VSD extended-mode communication. VSD card device 71 could be VSD card 34 of FIG. 7, or VSD card 34 could have only a subset of all the protocol processors that VSD card device 71 has. Likewise, VSD host 51' could be the same as VSD host 51 of FIG. 7, or could have only a subset of all the protocol processors that VSD host 51 of FIG. 7 has.

VSD connector 70 of VSD card device 71 could be plugged into SD connector slot 50 of VSD host 51'. VSD connector 70 of VSD card device 71 could also be plugged into SD connector slot 50' of SD host 75, which does not support VSD mode, or VSD connector 70 of VSD card device 71 could be plugged into SD connector slot 50'' of MMC host 77, which does not support VSD mode, but does support MMC or SPI mode.

Card device 71 has processor system 88 for executing programs including card-initialization and bus-response programs. Multi-personality bus interface 73 processes data from processor system 88 using various protocols. SD processor 76 processes data using the SD protocol, and inputs and outputs data on the SD data lines in VSD connector 70. Other protocol processors communicate with VSD connector 70 through multi-personality bus switch 72, which selects one protocol processor.

The contact pins in VSD connector 70 connect to multi-personality bus switch 72 as well as to SD processor 76. Transceivers in multi-personality bus switch 72 buffer data to and from the transmit and receive pairs of differential data lines in the metal contacts for extended protocols such as PCI-Express, Firewire IEEE 1394, Serial-Attached SCSI, and SATA, and for the older MultiMediaCard.

When an initialization routine executed by processor system 88 is commanded to use MMC-compatible SPI mode, when the host is MMC host 77, MMC processor 78 is activated to communicate with MMC host 77 connected to VSD connector 70, while SD processor 76 is disabled. Personality selector 74 configures multi-personality bus switch 72 to connect VSD connector 70 to MMC processor 78 when processor system 88 is commanded to use MMC-compatible mode. When the host is SD host 51, SD processor 76 continues to communicate with SD host 75 after initialization is complete.

When the host initialization routine determines that both VSD card device 71 and VSD host 51' can support VSD mode, VSD host 51' sends a command through SD processor 76 to processor system 88 to switch to VSD mode. Then one of the higher-speed serial-bus protocols is selected for use. For example, when processor system 88 is commanded to use PCI-Express, personality selector 74 configures multi-personality bus switch 72 to connect VSD connector 70 to PCI-Express processor 82. Then processor system 88 communicates with PCI-Express processor 82 instead of SD processor 76 when PCIE extended mode is activated.

When the host initialization routine determines that the inserted card supports VSD with USB, processor system 88 is commanded to switch to USB mode. Personality selector 74 configures multi-personality bus switch 72 to connect VSD connector 70 to USB processor 80. Then processor system 88 communicates with USB processor 80 instead of SD processor 76 when USB extended mode is activated.

When the host initialization routine determines that the inserted card supports VSD with SATA, processor system 88 is commanded to switch to SATA mode. Personality selector 74 configures multi-personality bus switch 72 to connect VSD connector 70 to SATA processor 84. Then processor system 88 communicates with SATA processor 84 instead of SD processor 76 when SATA extended mode is activated.

When the host initialization routine determines that the inserted card supports VSD with Firewire, processor system 88 is commanded to switch to Firewire mode. Personality selector 74 configures multi-personality bus switch 72 to connect VSD connector 70 to IEEE 1394 processor 86. Then processor system 88 communicates with IEEE 1394 processor 86 instead of SD processor 76 when IEEE 1394 extended mode is activated.

VSD card device 71 may not support all protocols shown in FIG. 8, but may only support a subset. Some of protocol processors may be absent in some embodiments.

Figure 9:
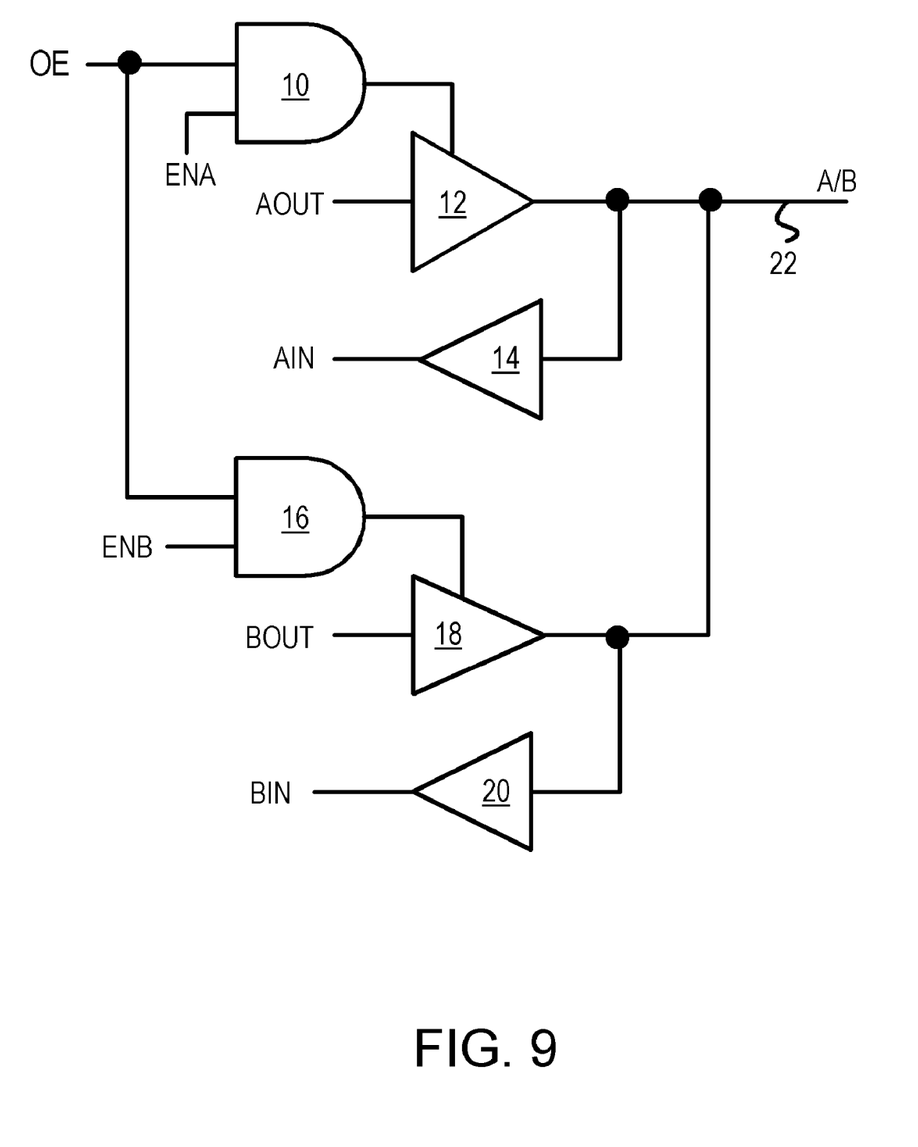
FIG. 9 is a functional diagram of a signal multiplexer.

FIG. 9 is a functional diagram of a signal multiplexer. Multiplexed line 22 could be connected to one of the metal contact pads in the SD connector, or could be an internal bus line. Input buffer 14 buffers line 22 to generate AIN for the A interface, while input buffer 20 buffers line 22 to generate BIN for the B interface. When line 22 is an output or is an I/O line that is being driven, output-enable signal OE is activated high. When the A interface is active, ENA is high and AND gate 10 drives a high to enable output buffer 12, which drives AOUT onto line 22. When the B interface is active, ENB is high and AND gate 16 drives a high to enable output buffer 18, which drives BOUT onto line 22.

Additional interfaces C, D, etc. can mux to the same line 22 by adding additional AND gates and input and output buffers. Additional enable signals ENC, END, etc. can be generated. The interfaces can be for MMC, USB, SATA, IEEE 1394, PCIE, and SD.

Interface Pin Tables

Figure 10:
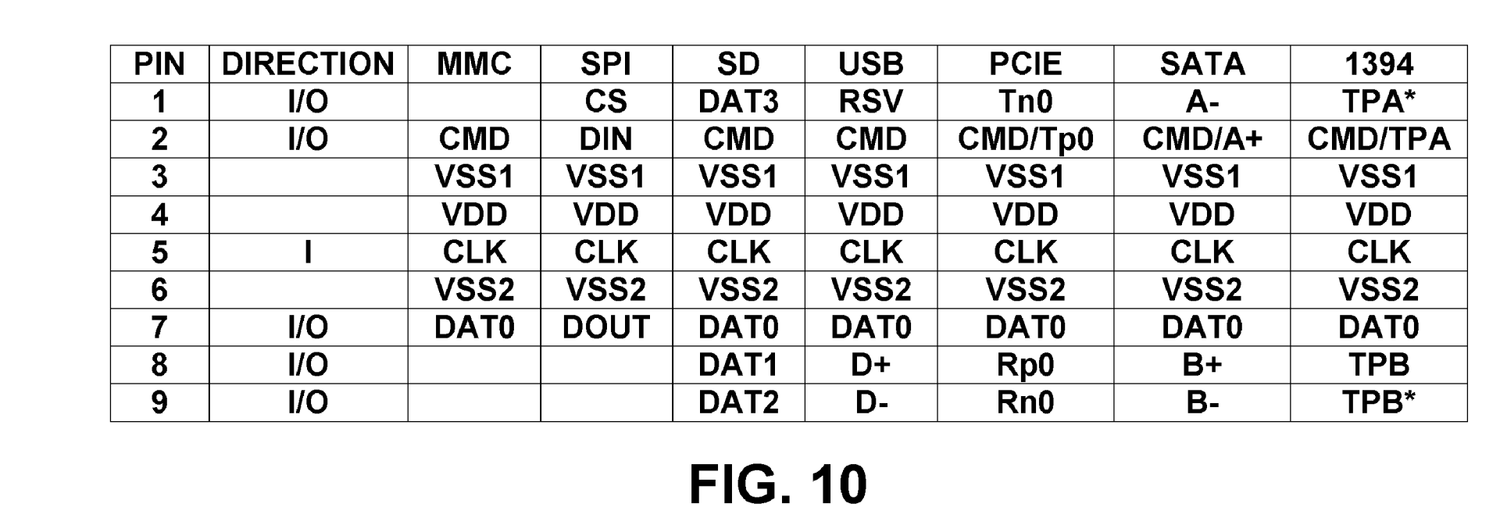
FIG. 10 is a table showing signal multiplexing with a 9-pin SD connector.

FIG. 10 is a table showing signal multiplexing with a 9-pin SD connector. Power (VDD) is provided on pin 4, while grounds are provided on pins 3 and 6. A clock is input to the card on line 5, while pin 7 is a serial data I/O DAT0 for all interfaces.

Pin 2 is a bi-directional command CMD line for MMC, SD, and USB interfaces, and is a data input DIN for SPI (Serial Peripheral Interface), which is a full-duplex, synchronous, serial data link standard across many microprocessors, micro-controllers, and peripherals. SPI enables communication between microprocessors and peripherals and/or inter-processor communication. SPI mode is a subset of the MultiMediaCard protocol. The SPI interface has a chip-select on pin 1 and a data-output to the host on pin 7. The SPI and MMC interfaces do not use pins 8, 9.

For the SD interface, up to four data lines may be used at a time, although only one data line may be used during a particular communication session. Data line DAT0 is on pin 7, DAT1 on pin 8, DAT2 on pin 9, and DAT3 on pin 1.

When VSD mode is active and the USB protocol selected, serial USB data is transferred bidirectionally over the USB differential data lines D+, D−. The CMD, CLK, and DAT0 lines can still be connected to the SD processor, allowing 1-bit SD communication to continue while USB is being used.

When VSD mode is active and the PCIE protocol selected, serial PCI data is transferred over two pairs of differential data lines. Transmit lines Tp0, Tn0 on pins 2, 1 are output by the card and received by the host, while receive lines Rp0, Rn0 on pins 8, 9 are output by the host and received by the card.

When VSD mode is active and the SATA protocol selected, serial ATA data is transferred over two pairs of differential data lines. A lines A+, A− on pins 2, 1 are output by the host and received by the card, while B lines B+, B− on pins 8, 9 are output by the SD card and received by the host. SD communication stops while SATA is being used.

When VSD mode is active and the Firewire protocol selected, serial IEEE-1394 data is transferred over two pairs of differential data lines. Transmit-pair-A lines TPA, TPA* on pins 2, 1 are output by the card and received by the host, while transmit-pair-B lines TPB, TPB* on pins 8, 9 are output by the host and received by the card. SD communication stops while IEEE-1394 is being used.

Figure 11:
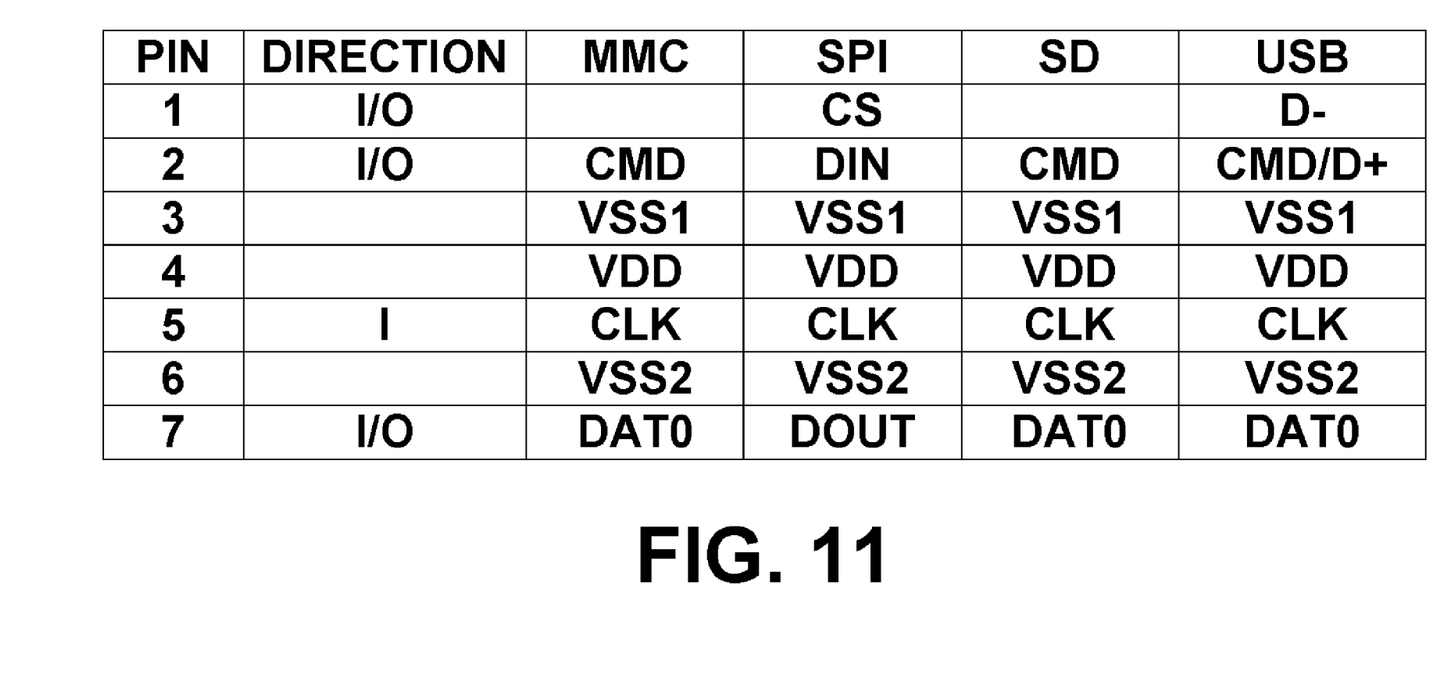
FIG. 11 is a table showing signal multiplexing with a 7-pin MMC connector.

FIG. 11 is a table showing signal multiplexing with a 7-pin MMC connector. Older legacy hosts may support only MMC. USB, SD, SPI, and MMC are supported, but not other interfaces such as SATA, IEEE-1394, and PCIE. Although there are 6 MMC signal pins, the MMC interface has an extra, unused pin, for a 7-pin physical interface. Power (VDD) is provided on pin 4, while grounds are provided on pins 3 and 6. A clock is input to the card on line 5, while pin 7 is a serial data I/O DAT0 for all interfaces.

Pin 2 is a bi-directional command CMD line for MMC, SD, and USB interfaces, and is a data input DIN for SPI. The SPI interface has a chip-select on pin 1 and a data-output to the host on pin 7. The SPI and MMC interfaces do not use pins 8, 9.

For the SD interface, up to four data lines may be used at a time, although only one data line may be used during a particular communication session. Data line DAT0 is on pin 7, DAT1 on pin 8, DAT2 on pin 9, and DAT3 on pin 1.

When VSD mode is active and the USB protocol selected, serial USB data is transferred bidirectionally over the USB differential data lines D+, D− on pins 2, 1. Thus USB can still be supported when only 7 pins are available.

Figure 12:
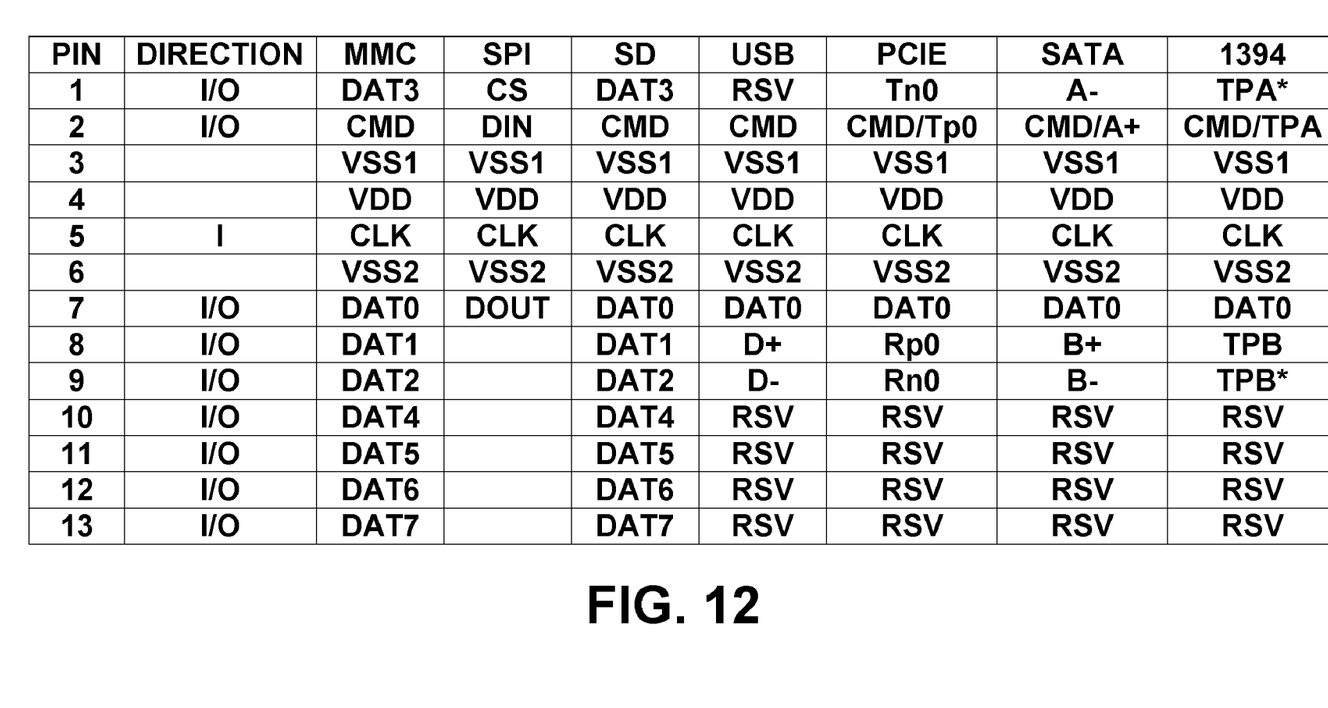
FIG. 12 is a table showing pin multiplexing for an extended 13-pin connector.

FIG. 12 is a table showing pin multiplexing for an extended 13-pin connector. Additional pins 10–13 are used as data pins DAT4:7 on an extended SD interface, and on an extended MMC interface. These additional 4 pins can be reserved for the serial-bus interfaces such as for the MMC specification version 4.0.

Figure 13:
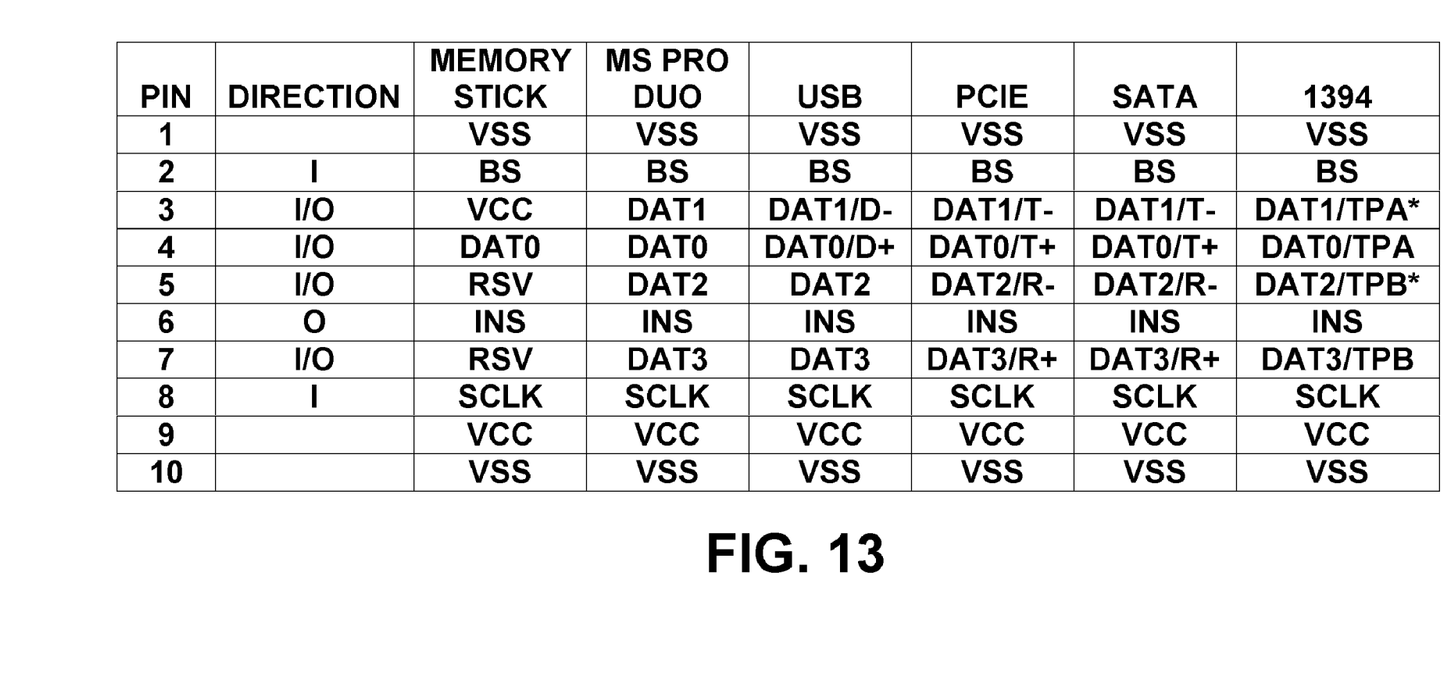
FIG. 13 is a table showing pin multiplexing for a 10-pin Memory Stick system.

FIG. 13 is a table showing pin multiplexing for a 10-pin Memory Stick system. Rather than use SD, the extended interface could be designed for other card base-protocols, such as Memory Stick (MS). Memory Stick has a 10-pin connector, with power on pins 3 and 9, and ground on pins 1 and 10. Pin 8 is a system clock (SCLK) input, while pin 2 is a bus-state (BS) input. Data is carried bidirectionally by DAT0 on pin 4, while pin 6 is an insertion (INS) pin that can be pulled up by a resistor on the MS card to indicate that the card has been inserted.

Pins 5 and 7 are reserved for MS, but are used by an extension known as MS Pro Duo. MS Pro Duo has a 4-bit data bus, DAT0:3, using pins 4, 3, 5, 7, respectively. One less power is available for MS Pro Duo, since pin 3 is used for DAT1 rather than VCC.

For a MS-USB extended mode, pins 4, 3 carry the USB differential data pair D+, D−. Other pins can be used for MS or MS Pro Duo signaling. For PCIE extended mode, pins 4, 3 carry the PCI transmit differential data pair T+, T−, while pins 7, 5 carry the PCI receive differential data pair, R+, R−. Likewise, for SATA extended mode, pins 4, 3 carry the SATA transmit differential data pair T+, T−, while pins 7, 5 carry the SATA receive differential data pair, R+, R−. For IEEE 1394 extended mode, pins 4, 3 carry the 1394 A differential data pair TPA, TPA*, while pins 7, 5 carry the 1394 B differential data pair, TPB, TPB*.

ALTERNATE EMBODIMENTS

Several other embodiments are contemplated by the inventors. For example, a variety of materials may be used for the card substrate, circuit boards, metal contacts, card case, etc. Plastic cases can have a variety of shapes and may partially or fully cover different parts of the circuit board and connector, and can form part of the connector itself. Various shapes and cutouts can be substituted. Pins can refer to flat metal leads or other contactor shapes rather than pointed spikes.

Many extended protocols such as PCI-Express, USB, serial ATA, Serial Attached SCSI, or Firewire IEEE 1394 can be used as the second interface. The host may support various serial-bus interfaces, and can first test for USB operation, then IEEE 1394, then SATA, then SA SCSI, etc, and later switch to a higher-speed interface such as PCI-Express.

The SD card could be replaced by a Memory Stick (MS) card, a MS Pro card, a MS Duo card, a Mini-SD card, a reduced-size MMC card, etc. A hardware switch could replace some of the card-detection routine steps. For example, a pull-up resistor could be added on the card device to a ground pin to be used as a card-detect line.

A special LED can be designed to inform the user which electrical interface is currently in use. For example, if the standard SD interface is in use, then this LED can be turned on. Otherwise, this LED is off. If more than 2 modes exists, then a multi-color LED can be used to specify the mode, such as green for PCI-Express and yellow for USB.

Different power-supply voltages may be used. USB and SATA may use a 5-volt supply, while SD and MMC use a 3.3-volt supply, and PCIE uses a 1.5-volt supply. A 3.3-volt supply could be applied to the VCC pin, and an internal voltage converter on the VSD card could generate other voltages, such as 5 volts using a charge pump, and 1.5 volts using a DC-to-DC converter.

PCI Express system bus management functions can be achieved by the two differential pairs of the VSD/PCIE interface. Clock signals such as REFCLK+ and REFCLK− are signals that can be added using additional pads. The side band signals of PCIE can be added, such as CPPE#, CPUSB#, CLKREQ#, PERST#, WAKE#, +3.3AUX, SMB-DATA, SMBCLK, etc. with additional pads. Also, the approach of using modified PCIE signals can be applied to the design of serially-buffered memory modules of DRAMs.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. An extended primary-protocol card comprising:
a housing having a primary-protocol form factor for fitting into a host slot for receiving a primary-protocol card;
a connector along an insertable edge of the housing, the connector having metal pads for making electrical connection to a primary-protocol host or to an extended-primary-protocol host;
wherein the metal pads comprise primary-interface pads and multiplexed pads;
wherein the primary-interface pads comprise a primary-protocol-data pad for sending and receiving primary-protocol data;
a primary-protocol controller, coupled to the primary-interface pads, for initially communicating with the primary-protocol host by sending primary-protocol data over the primary-protocol-data pad;
wherein the multiplexed pads include a first pair of differential data lines for carrying serial data; and
an extended-protocol controller, coupled to the multiplexed pads, for serially communicating serial data over the first pair of differential data lines to the extended-primary-protocol host during an extended mode,
wherein the primary-protocol data is initially communicated using the primary-interface pads, and serial data is serially communicated over the first pair of differential data lines during the extended mode.

2. The extended primary-protocol card of claim 1 wherein primary-protocol data is received over the primary-protocol-data pad in synchronization to a clock on a clock pad in the metal pads.

3. The extended primary-protocol card of claim 2 wherein the multiplexed pads further comprise a second primary-protocol-data pad, a third primary-protocol-data pad, and a fourth primary-protocol-data pad for carrying the primary-protocol data;
wherein the primary-protocol data is received in up to four-bit nibbles synchronized to the clock.

4. The extended primary-protocol card of claim 3 wherein the first pair of differential data lines are the second primary-protocol-data pad and the third primary-protocol-data pad,
whereby the multiplexed pads include a pair of pads used for differential data lines and for two bits of the primary-protocol data.

5. The extended primary-protocol card of claim 1 wherein an extended protocol of the extended-protocol controller is a Universal-Serial-Bus (USB) protocol and the first pair of differential data lines are bi-directional.

6. The extended primary-protocol card of claim 1 wherein an extended protocol of the extended-protocol controller is a PCI-Express protocol, a Serial-Advanced-Technology-Attachment (SATA) protocol, or a IEEE 1394 protocol;
wherein the first pair of differential data lines are unidirectional lines receiving the serial data from the extended-primary-protocol host;
wherein the multiplexed pads further comprise:
a second pair of differential data lines that are unidirectional lines transmitting the serial data to the extended-primary-protocol host,
whereby two pairs of differential data lines communicate the serial data.

7. The extended primary-protocol card of claim 6 wherein a line in the second pair of differential data lines carries a command signal to the primary-protocol controller from the primary-protocol host.

8. The extended primary-protocol card of claim 1 wherein a primary-protocol of the primary-protocol controller is a Secure-Digital (SD) card protocol and the primary-protocol-data pad is in the primary-interface pads.

9. The extended primary-protocol card of claim 8 wherein the connector has 9 metal pads for making electrical connection to a SD host or to an extended-SD host.

10. The extended primary-protocol card of claim 8 wherein a primary-protocol of the primary-protocol controller is a MultiMediaCard (MMC) protocol and the primary-protocol-data pad is in the primary-interface pads.

11. The extended primary-protocol card of claim 10 wherein the connector has 7 metal pads for making electrical connection to a MMC host or to an extended-MMC host.

12. The extended primary-protocol card of claim 1 wherein a primary-protocol of the primary-protocol controller is a Memory-Stick (MS) protocol and the primary-protocol-data pad is in the multiplexed pads;
wherein the primary-protocol-data pad is multiplexed with a pad for one of the first pair of differential data lines.

13. The extended primary-protocol card of claim 1 further comprising:
a processor system, coupled to the primary-protocol controller during an initial mode, but connected to the extended-protocol controller during the extended mode.

14. The extended primary-protocol card of claim 13 wherein the primary-protocol controller communicates with the extended-primary-protocol host over the primary-interface pads during the initial mode before the extended mode is activated by a command sent during the initial mode.

15. A card-detection and communication method comprising:
inserting a card into a slot on a dual-interface host to make contact with primary-interface pads and with extended-interface pads;
applying power and ground over the primary-interface pads to power up the card;
periodically pulsing a clock to the card over a clock pad in the primary-interface pads;
sending data to the card over a first data pad in the primary-interface pads, the data including a first command;
when the card does not respond in an expected manner to the first command, sending a second command to the card over the first data pad to identify the card;
when the card responds in an expected manner to the second command, initializing the card as a MultiMediaCard (MMC);
when the card responds in the expected manner to the first command, sending a first advanced command to the card over the first data pad;
when the card does not respond in an expected manner to the first advanced command, sending the first command and the second command over the first data pad to the card, and initializing the card as a Secure-Digital card, and transferring data with the card over the first data pad;
when the card responds in the expected manner to the first advanced command:
determining an extended protocol supported by the card and by the dual-interface host by analyzing response from the card sent over the first data pad;
sending a command to the card over the first data pad to switch to an extended mode;
sending serial data to the card and receiving serial data from the card over a first pair of differential data lines in the extended-interface pads using a Universal-Serial-Bus (USB) protocol when the extended protocol is USB;
sending serial data to the card over the first pair of differential data lines in the extended-interface pads and receiving serial data from the card over a second pair of differential data lines in the extended-interface pads using a Serial-Advanced-Technology-Attachment (SATA) protocol when the extended protocol is SATA; and
sending serial data to the card over the first pair of differential data lines in the extended-interface pads and receiving serial data from the card over a second pair of differential data lines in the extended-interface pads using an IEEE 1394 protocol when the extended protocol is IEEE 1394,
whereby serial data is transmitted over differential data lines during the extended mode, but serial data is sent over the first data pad before the extended mode is activated.

16. A multi-personality removable-card interface comprising:

dual-personality connector slot means for connecting to a standard-protocol card and for connecting to an extended-protocol card, the dual-personality connector slot means having a connector slot cavity, the connector slot cavity able to accept the standard-protocol card, the connector slot cavity also able to accept the extended-protocol card, the dual-personality connector slot means including standard metal contacts and extended metal contacts that both make contact with the standard-protocol card and both make contact with the extended-protocol card;

standard-protocol processor means, coupled to the standard metal contacts, for generating and receiving signals using a standard protocol for transmission through the dual-personality connector slot means;

extended-protocol processor means, coupled to the extended metal contacts, for generating and receiving signals using an extended protocol for transmission through the dual-personality connector slot means;

multi-personality bus switch means for connecting the extended metal contacts to the extended-protocol processor means when operating in a first extended mode, but for not connecting the extended metal contacts when operating in a standard mode; and program means for executing an initialization program that initially sends and receives commands using the standard protocol through the standard-protocol processor means, but switches from the standard mode to the first extended mode to send and receive commands using the extended protocol through the extended-protocol processor means when the extended-protocol card is detected, whereby communication through the dual-personality connector slot means to the extended-protocol card is initially using the standard metal contacts but switches to using the extended metal contacts.

17. The multi-personality removable-card interface of claim 16 wherein the standard protocol is Secure-Digital (SD), MultiMediaCard (MMC), or Memory-stick (MS);

wherein the extended protocol is Universal-Serial-Bus (USB), PCI-Express, serial ATA, Serial Attached Small-Computer System Interface (SCSI), or Firewire IEEE 1394.

18. The multi-personality removable-card interface of claim 16 further comprising:

second extended-protocol processor means, coupled to the extended metal contacts, for generating and receiving signals using a second extended protocol for transmission through the dual-personality connector slot means;

wherein the multi-personality bus switch means is also for connecting the extended metal contacts to the second extended-protocol processor means when operating in a second extended mode, wherein the standard protocol, the extended protocol, and the second extended protocol are different protocols.

19. The multi-personality removable-card interface of claim 16 wherein the standard metal contacts of the dual-personality connector slot means comprise power and ground and a clock line and a data line that carries data in two directions;

wherein the extended metal contacts of the dual-personality connector slot means comprise a single pair of differential data lines that carry data in two directions;

wherein the extended protocol is Universal-Serial-Bus (USB).

20. The multi-personality removable-card interface of claim 18 wherein the extended metal contacts of the dual-personality connector slot means comprise a first pair of differential data lines that carry data in an outgoing direction and a second pair of differential data lines that carry data in an incoming direction;

wherein the second extended protocol is PCI-Express, serial ATA, Serial Attached Small-Computer System Interface (SCSI), or Firewire IEEE 1394.

21. The multi-personality removable-card interface of claim 16 wherein the commands include a read-card command to read a card-reply indicator that indicates when the dual-personality connector slot means is connected to the extended-protocol card and when the dual-personality connector slot means is connected to the standard-protocol card;

the commands also including a switch command to switch operation to the first extended mode from the standard mode.

\* \* \* \* \*